United States Patent
Okazaki et al.

(10) Patent No.: US 11,482,760 B2
(45) Date of Patent: Oct. 25, 2022

(54) BUSBAR MODULE (71) Applicant: YAZAKI CORPORATION, Tokyo (JP)

(72) Inventors: Yutaro Okazaki, Kakegawa (JP); Yoh Matsui, Kakegawa (JP); Koji Haneda, Kakegawa (JP); Masao Kubota, Fujieda (JP); Daiki Tanaka, Fujieda (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 17/151,060

(22) Filed: Jan. 15, 2021

(65) Prior Publication Data
US 2021/0226303 A1 Jul. 22, 2021

(30) Foreign Application Priority Data
Jan. 17, 2020 (JP) .............................. JP2020-006204

(51) Int. Cl.
*H02G 3/04* (2006.01)
*H01M 50/505* (2021.01)

(52) U.S. Cl.
CPC ........ *H01M 50/505* (2021.01); *H02G 3/0437* (2013.01); *H01M 2220/20* (2013.01); *H02G 3/0418* (2013.01)

(58) Field of Classification Search
CPC ................ H01R 13/7175; H01R 13/74; H01R 2201/26; B60R 16/0215; B60R 16/0222; H02G 11/006; H02G 3/0462; H02G 3/34; H02G 3/0418; H02G 3/0437; H02G 3/088; H02G 3/22; H02G 3/30; H02G 3/32; H02G 15/007; H02G 11/00; H02G 3/0608; H02G 11/003; H02G 9/02; H02G 15/14; H02G 3/0456; H02G 3/0487; H02G 3/263;
(Continued)

(56) References Cited

U.S. PATENT DOCUMENTS 3,351,699 A * 11/1967 Merckle ............... H02G 3/0608
174/101
5,161,580 A * 11/1992 Klug .................... H02G 3/0608
174/101
(Continued)

FOREIGN PATENT DOCUMENTS

| EP | 3136470 A1 | 3/2017 |
| JP | 2012-164591 A | 8/2012 |
| JP | 2019-212421 A | 12/2019 |
| WO | 2019/230542 A1 | 12/2019 |

*Primary Examiner* — Krystal Robinson
(74) *Attorney, Agent, or Firm* — Kenealy Vaidya LLP (57) ABSTRACT

A busbar module includes a case to be attached to a battery assembly, a busbar supported by the case and to be connected to an electrode of single cells of the battery assembly and electric wires to be routed in the case. The case is provided with electric wire routing grooves to accommodate the electric wires, the electric wire routing grooves intersecting with one another. A part of the plurality of electric wires bends at a connection portion of the plurality of electric wire routing grooves. The connection portion is provided with a guide taper provided inside a bent portion of the part of the plurality of electric wires and a wire locking portion to lock the at least a part of the electric wires at a side of the bent portion of the at least the part of the electric wires.

7 Claims, 10 Drawing Sheets

(58) Field of Classification Search
CPC .......... H02G 1/14; H02G 11/02; H02G 3/045;
H02G 1/00; H02G 15/08; H02G 3/0431;
H02G 3/0475; H02G 1/08; H02G 1/085;
H02G 1/10; H02G 1/1214; H02G 3/0406;
H02G 3/083; H02G 3/36; H02G 1/06;
H02G 1/1212; H02G 1/1229; H02G
1/1248; H02G 15/02; H02G 15/06; H02G
3/0412; H02G 3/081; H02G 3/123; H02G
3/125; H02G 3/26; H02G 3/388; H02G
1/02; H02G 1/04; H02G 1/086; H02G
1/088; H02G 1/1217; H02G 1/1224;
H02G 1/1292; H02G 15/064; H02G
15/068; H02G 15/113; H02G 15/115;
H02G 15/117; H02G 15/18; H02G
15/184; H02G 3/00; H02G 3/0481; H02G
3/06; H02G 3/0691; H02G 3/105; H02G
3/128; H02G 3/14; H02G 3/18; H02G
3/305; H02G 7/00; H02G 7/05; H02G
7/056; H02G 9/025; H02G 9/065; H02G
9/08; H02G 9/10; H02G 3/38; H02G
3/04; H02G 5/007; H02G 3/0468; H02G
3/08; H02G 3/086; H02G 3/12; H02G
5/025; H02G 3/16; H02B 1/01; H02B
1/30; H02B 1/40
USPC .................................. 439/212, 92; 174/72 A
See application file for complete search history.

(56) References Cited

U.S. PATENT DOCUMENTS

| | | | | |
|---|---|---|---|---|
| 5,271,585 | A * | 12/1993 | Zetena, Jr. | H02G 3/263 174/95 |
| 6,346,011 | B1 * | 2/2002 | Ikeda | H01M 10/482 439/627 |
| 6,383,014 | B1 * | 5/2002 | Saito | B60R 16/0215 439/456 |
| 6,535,683 | B1 * | 3/2003 | Johnson | G02B 6/44 385/136 |
| 9,581,270 | B2 * | 2/2017 | Peterson | H02G 3/0487 |
| 2013/0161053 | A1 * | 6/2013 | Okamoto | H01M 50/20 174/68.1 |
| 2013/0171495 | A1 | 7/2013 | Ogasawara et al. | |
| 2014/0212732 | A1 * | 7/2014 | Ichikawa | H01M 50/502 174/68.2 |
| 2014/0363723 | A1 * | 12/2014 | Imai | H01M 50/502 429/121 |
| 2016/0134089 | A1 * | 5/2016 | Peterson | F16L 3/23 174/72 A |
| 2017/0005317 | A1 * | 1/2017 | Schlemmer | H01M 50/155 |
| 2017/0328783 | A1 | 11/2017 | Okamoto et al. | |
| 2018/0198105 | A1 * | 7/2018 | Sato | H01M 10/482 |
| 2021/0167348 | A1 * | 6/2021 | Okazaki | H01M 50/502 |
| 2021/0210822 | A1 | 7/2021 | Yanagida et al. | |

* cited by examiner

BUSBAR MODULE

CROSS-REFERENCE TO RELATED APPLICATION

The present application claims priority to Japanese Patent Application No. 2020-006204 filed on Jan. 17, 2020, the entire content of which is incorporated herein by reference.

TECHNICAL FIELD

The present invention relates to a busbar module.

BACKGROUND

A power supply device mounted on various vehicles, such as an electric automobile that travels using an electric motor and a hybrid automobile that travels using an engine and an electric motor in combination, is provided with a busbar module an upper portion of a battery assembly including a plurality of single cells. The busbar module includes a plurality of busbars electrically connected to electrodes of the plurality of single cells. These busbars are accommodated and held in a resin case attached to the upper portion of the battery assembly (see, for example, JP2012-164591A). The case of the busbar module includes an electric wire routing groove for accommodating and routing an electric wire such as a voltage detection line connected to an electrode of a single cell to detect a voltage of the single cell and a temperature detection line connected to a thermistor to measure a temperature of a single cell.

However, in a case where a plurality of electric wire routing groove portions that intersect with each other and are connected to each other, an electric wire may be bent and routed at a connection portion of the electric wire routing groove portions, in such a case, at the connection portion of the electric wire routing groove portions, the electric wire may protrude from the electric wire routing groove portion and ride on a corner portion of the electric wire routing groove portion.

SUMMARY

Illustrative aspects of the present invention provide a busbar module configured to allow routing of an electric wire smoothly to an electric wire routing groove portion of a case without problems such as a protrusion.

According to an illustrative aspect of the present invention, a busbar module includes a case configured to be attached to a battery assembly including a plurality of single cells, a busbar supported by the case and configured to be electrically connected to an electrode of each of the plurality of single cells of the battery assembly and a plurality of electric wires configured to be routed in the case. The case is provided with a plurality of electric wire routing grooves configured to accommodate and route the plurality of electric wires, the plurality of electric wire routing grooves intersecting with and being connected to one another. At least a part of the plurality of electric wires are configured to be bent at a connection portion of the plurality of electric wire routing grooves at which the plurality of electric wire routing grooves are connected to one another. The connection portion is provided with a guide taper provided inside a bent portion of the at least a part of the plurality of electric wires, the guide taper being configured to guide the at least a part of the plurality of electric wires and a wire locking portion configured to lock the at least a part of the plurality of electric wires at a side of the bent portion of the at least a part of the plurality of electric wires.

Other aspects and advantages of the invention will be apparent from the following description, the drawings and the claims.

BRIEF DESCRIPTION OF DRAWINGS

FIGS. 8A and 8B are diagrams showing the electric wire take-out portion, where FIG. 8A is a plan view and FIG. 8B is a cross-sectional view taken along a line A-A in FIG. 8A;

DESCRIPTION OF EMBODIMENTS

Figure 1:
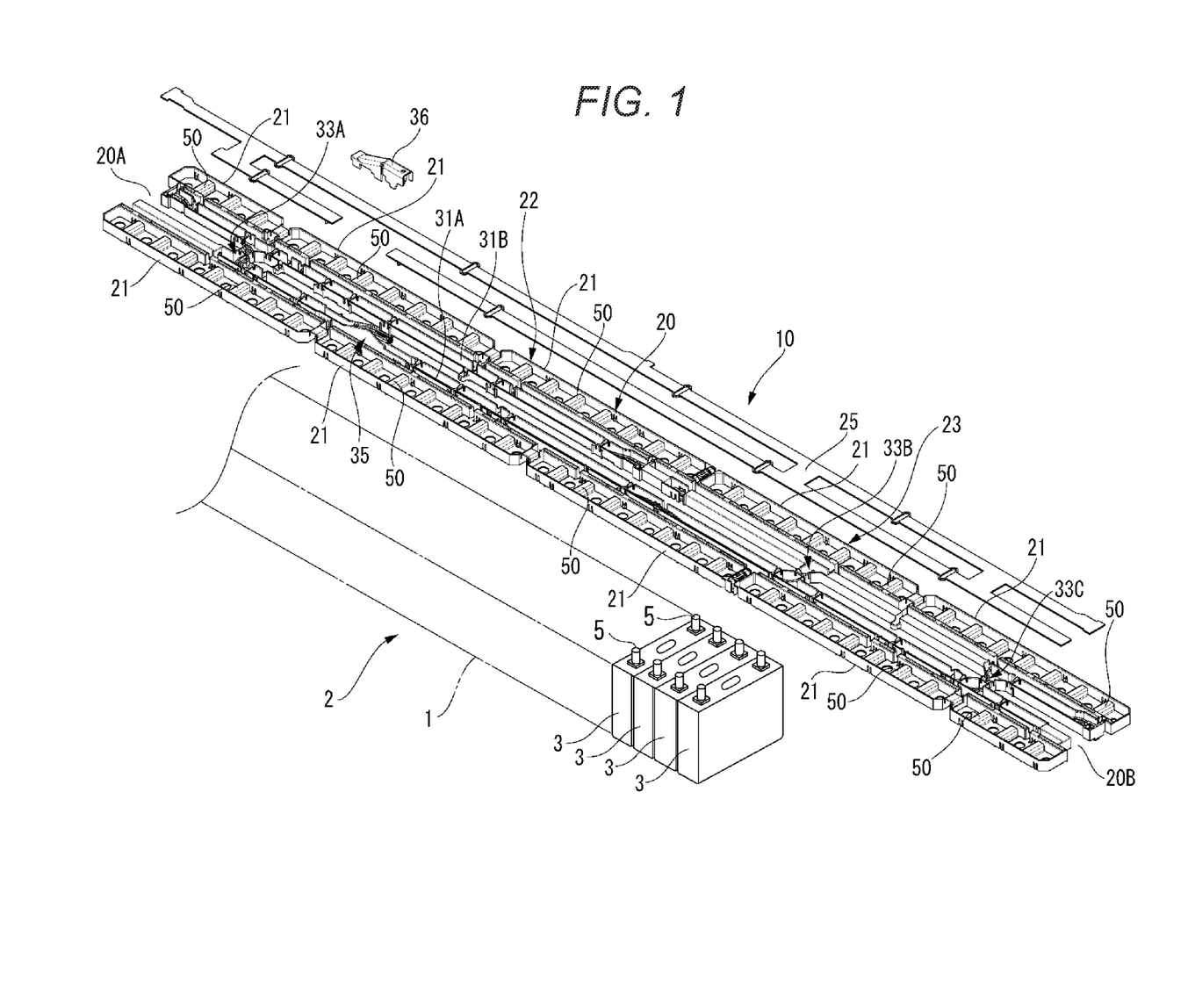
FIG. 1 is a perspective view of a busbar module and a battery assembly according to an embodiment of the present invention.

Hereinafter, embodiments of the present invention will be described with reference to the drawings. FIG. 1 is a perspective view of a busbar module 10 and a battery assembly 1 according to an embodiment of the present invention.

As shown in FIG. 1, a power supply device 2 includes the busbar module 10 according to the embodiment attached to an upper portion of the battery assembly 1. The power supply device 2 is mounted on and used in various vehicles such as an electric automobile that travels using an electric motor, and a hybrid automobile that travels using an engine and an electric motor in combination, and supplies power to the electric motor.

The battery assembly 1 includes a plurality of single cells 3 arranged in a row along one direction. Each of the single cells 3 is formed in a rectangular parallelepiped shape, and includes a pair of electrodes 5 protruding from one end side and the other end side of an upper surface of the single cell 3. One of the pair of electrodes 5 is a positive electrode and the other one is a negative electrode.

In the battery assembly 1, the plurality of (four in this example) singe cells 3 are provided adjacent to each other and form one set of the single cells 3, and the electrodes 5 are aligned thereon. The busbar module 10 connects sets of the single cells 3 in series by busbars 50 to be described later.

Figure 2:
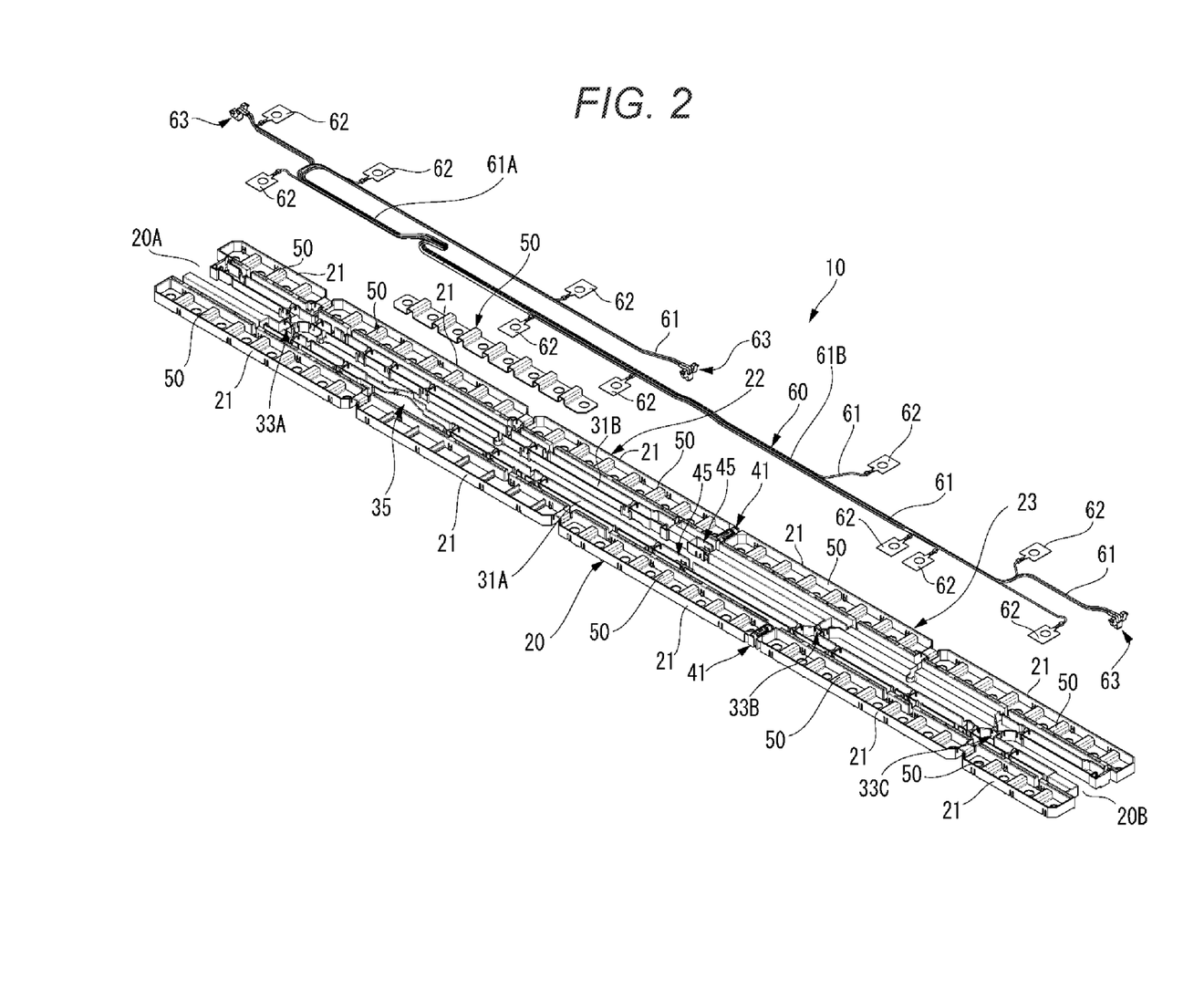
FIG. 2 is an exploded perspective view of the busbar module according to the embodiment.

FIG. 2 is an exploded perspective view of the busbar module 10 according to the embodiment. As shown in FIG. 2, the busbar module 10 includes a case 20, the busbars 50, and a wire harness 60 including a plurality of electric wires 61.

The case 20 is formed of, for example, an electrically insulating synthetic resin, and includes a plurality of busbar accommodating portions 21.

The busbar accommodating portions 21 are arranged in two rows along an arrangement direction of the plurality of single cells 3, along which the plurality of single cells 3 are arranged. The busbar accommodating portion 21 is formed in a frame shape, and the busbars 50 are to be accommodated in the busbar accommodating portion 21.

A first electric wire routing groove portion 31A and a second electric wire routing groove portion 31B, which are a part of electric wire routing grooves, are provided between the two rows of busbar accommodating portions 21. The first electric wire routing groove portion 31A and the second electric wire routing groove portion 31B extend along the rows of the busbar accommodating portions 21 in a longitudinal direction of the case 20, respectively. In addition, a first electric wire passing portion 33A, a second electric wire passing portion 33B, and a third electric wire passing portion 33C, which are also a part of electric wire routing grooves, are provided between the first electric wire routing groove portion 31A and the second electric wire routing groove portion 31B, as the electric wire routing groove portion.

The first electric wire passing portion 33A is provided in a vicinity of one end 20A (first end 20A) of the case 20. The second electric wire passing portion 33B is provided in a middle of the case 20 in a longitudinal direction, and the third electric wire passing portion 33C is provided in a vicinity of the other end 20B (second end 20B) of the case 20. In other words, when a direction from the other end 20B (second end 20B) toward the one end 20A (first end 20A) is defined as a first direction and another direction oriented from the one end 20A toward the other end 20B, which is opposite to the first direction, is defined as a second direction, the first electric wire passing portion 33A is provided furthest in the first direction, the second electric wire passing portion 33B is in the middle and the third electric wire passing portion 33C is furthest in the second direction. As shown in FIG. 1, a cover 25 is attached to the case 20 from above. By attaching the cover 25 to the case 20, the first electric wire routing groove portion 31A, the second electric wire routing groove portion 31B, the first electric wire passing portion 33A, the second electric wire passing portion 33B, and the third electric wire passing portion 33C are covered with the cover 25.

The case 20 includes an electric wire take-out portion 35. The electric wire take-out portion 35 is provided between the first electric wire passing portion 33A and the second electric wire passing portion 33B in the first electric wire routing groove portion 31A. An electric wire holding cover 36 can be attached to the electric wire take-out portion 35 from above.

As shown in FIG. 2, the plurality of electric wires 61 of the wire harness 60 are electric wires for voltage detection with connection terminals 62 connected to end portions, and electric wires for temperature measurement with thermistors 63 connected to end portions. The connection terminals 62 are fastened to the electrodes 5 of the single cells 3 together with the respective busbars 50, and are electrically connected to the busbars 50. In addition, the thermistor 63 comes into contact with a specific single cell 3 of the battery assembly 1 to measure a temperature of the single cell 3. Each electric wire 61 of the wire harness 60 is connected either to a control circuit board (not shown) including a voltage monitoring circuit and a temperature monitoring circuit.

The electric wires 61 of the wire harness 60 according to the present embodiment are divided into an electric wire group 61A drawn into from one end 20A side of the case 20 and an electric wire group 61B drawn into from the other end 20B side of the case 20 with respect to the electric wire take-out portion 35. A part of the electric wire group 61A drawn into the electric wire take-out portion 35 from the one end 20A side of the case 20 in the first electric wire routing groove portion 31A, which is accommodated and routed in the second electric wire routing groove portion 31B, is drawn closer into the other end 20B side of the case 20 than the electric wire take-out portion 35. Further, the electric wire group 61A is passed through the second electric wire routing groove portion 31B and the first electric wire passing portion 33A, drawn into the first electric wire routing groove portion 31A from the one end 20A side of the case 20, and guided to the electric wire take-out portion 35.

The electric wire group 61B drawn into the electric wire take-out portion 35 from the other end 20B side of the case 20 in the first electric wire routing groove portion 31A is drawn closer into the other end 20B side of the case 20 than the electric wire take-out portion 35. In addition, a part of the electric wire group 61B accommodated and routed in the second electric wire routing groove portion 31B is passed through the second electric wire passing portion 33B and the third electric wire passing portion 33C provided closer to the other end side of the case 20 than the electric wire take-out portion 35 (i.e., the second electric wire passing portion 33B and the third electric wire passing portion 33C is provided further in the second direction than the electric wire take-out portion 35), and then is drawn into the first electric wire routing groove portion 31A. The electric wire group 61B is collected by the first electric wire routing groove portion 31A and guided to the electric wire take-out portion 35.

That is, the electric wires 61 of the wire harness 60 are accommodated and routed in the first electric wire routing groove portion 31A, the second electric wire routing groove portion 31B, the first electric wire passing portion 33A, the second electric wire passing portion 33B, and the third electric wire passing portion 33C. The electric wires 61 are drawn out to an outside from the electric wire take-out portion 35 provided in the first electric wire routing groove portion 31A.

Figure 3:
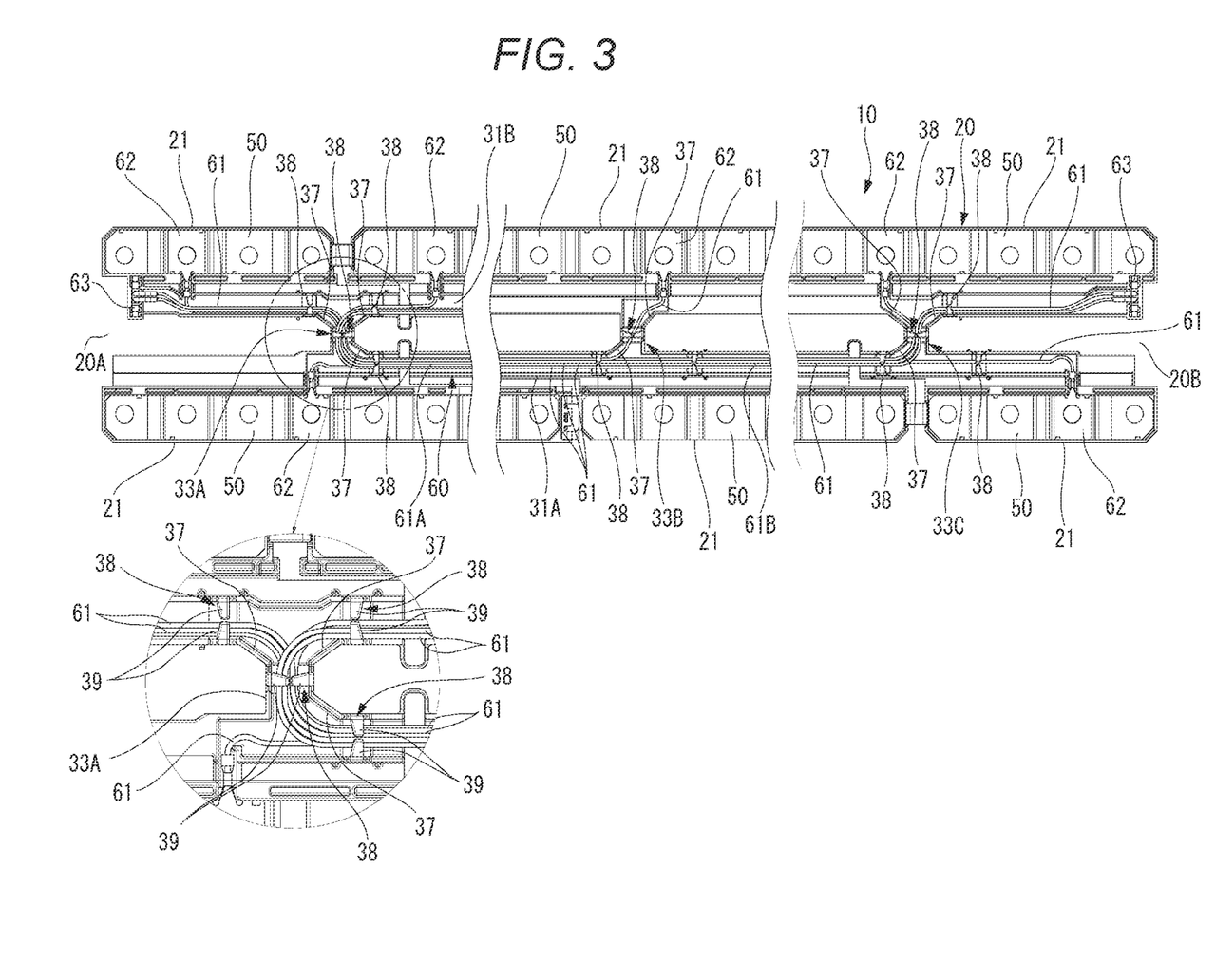
FIG. 3 is a plan view and a partial enlarged view of the busbar module according to the embodiment.
Figure 4:
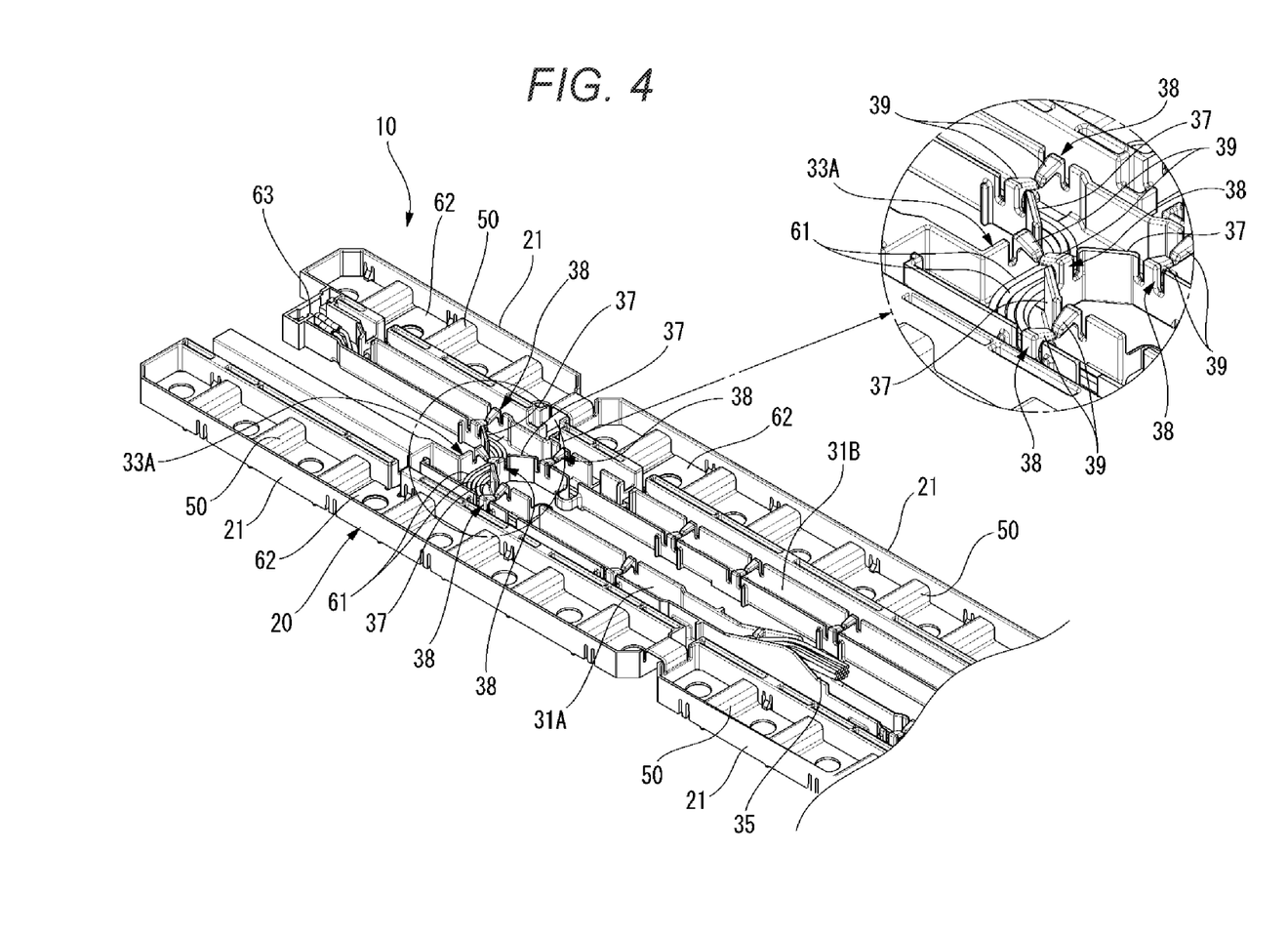
FIG. 4 is a perspective view and a partial enlarged view of the busbar module according to the embodiment.

FIG. 3 is a plan view and a partial enlarged view of the busbar module 10 according to the embodiment. FIG. 4 is a perspective view and a partial enlarged view of the busbar module 10 according to the embodiment.

The case 20 of the busbar module 10 is divided at a substantially middle portion in the longitudinal direction. Thus, the case 20 is composed of two divided cases 22, 23 which are divided in the longitudinal direction. These divided cases 22, 23 have a first coupling portion 41 and a second coupling portion 45, and are coupled to each other to form the case 20.

As shown in FIGS. 3 and 4, at connection portions where the first electric wire passing portion 33A, the second electric wire passing portion 33B, and the third electric wire passing portion 33C intersect with and are connected to the first electric wire routing groove portion 31A and the second electric wire routing groove portion 31B, a part of the electric wires 61 is bent and routed.

Next, a structure at the positions where the first electric wire passing portion 33A, the second electric wire passing portion 33B, and the third electric wire passing portion 33C are connected to the first electric wire routing groove portion 31A and the second electric wire routing groove portion 31B will be described.

A plurality of guide tapers (tapered corners) 37 are formed at positions where the first electric wire passing portion 33A is connected to the first electric wire routing groove portion 31A and the second electric wire routing groove portion 31B. These guide tapers 37 are provided at corner portions inside bent portions of the electric wires 61 which are bent and routed at the positions where the first electric wire passing portion 33A is connected to the first electric wire routing groove portion 31A and the second electric wire routing groove portion 31B. These guide tapers 37 are formed at an angle of approximately 45° with respect to the first electric wire routing groove portion 31A, the second electric wire routing groove portion 31B, and the first electric wire passing portion 33A. The guide tapers 37 are formed by removing corners at which the first electric wire routing groove portion 31A, the second electric wire routing groove portion 31B, and the first electric wire passing portion 33A intersect with one another. As a result, the bent portions of the electric wires 61 routed at the positions where the first electric wire passing portion 33A is connected to the first electric wire routing groove portion 31A and the second electric wire routing groove portion 31B are gently bent and routed along the guide tapers 37.

Similarly, the guide tapers 37 are formed at the corner portions inside the bends of the electric wires 61 which are bent and routed at positions where the second electric wire passing portion 33B is connected to the first electric wire routing groove portion 31A and the second electric wire routing groove portion 31B. These guide tapers 37 are formed at an angle of approximately 45° with respect to the first electric wire routing groove portion 31A, the second electric wire routing groove portion 31 B, and the second electric wire passing portion 33B. As a result, the bent portions of the electric wires 61 routed at the positions where the second electric wire passing portion 33B is connected to the first electric wire routing groove portion 31A and the second electric wire routing groove portion 31B are gently bent and routed along the guide tapers 37.

In addition, the guide tapers 37 are formed at the corner portions inside the bends of the electric wires 61 which are bent and routed at positions where the third electric wire passing portion 33C is connected to the first electric wire routing groove portion 31A and the second electric wire routing groove portion 31B. These guide tapers 37 are formed at an angle of approximately 45° with respect to the first electric wire routing groove portion 31A, the second electric wire routing groove portion 31B, and the third electric wire passing portion 33C. As a result, the bent portions of the electric wires 61 routed at the positions where the third electric wire passing portion 33C is connected to the first electric wire routing groove portion 31A and the second electric wire routing groove portion 31B are gently bent and routed along the guide tapers 37.

A single electric wire locking portion 38 is, or a plurality of electric wire locking portions 38 (a first wire locking portion and a second wire locking portion) are provided at positions where the first electric wire passing portion 33A is connected to the first electric wire routing groove portion 31A and the second electric wire routing groove portion 31B. Each of these electric wire locking portions 38 has a pair of locking pieces 39. The electric wires 61 are accommodated in the first electric wire routing groove portion 31A, the second electric wire routing groove portion 31B, and the first electric wire passing portion 33A by pushing the electric wires 61 from above into the first electric wire routing groove portion 31A, the second electric wire routing groove portion 31B, and the first electric wire passing portion 33A such that the electric wires 61 pass between the locking pieces 39. At least a side of the bent portions or both sides of the bent portions of the electric wires 61 accommodated in the first electric wire routing groove portion 31A, the second electric wire routing groove portion 31B, and the first electric wire passing portion 33A is or are locked and retained by the locking pieces 39 of a single wire locking portion 38 or the plurality of wire locking portions 38 (first and second wire locking portions 38).

Similarly, the single or the plurality of electric wire locking portions 38 (the first wire locking portion and the second wire locking portion) are provided at the positions where the second electric wire passing portion 33B is connected to the first electric wire routing groove portion 31A and the second electric wire routing groove portion 31B. Thus, a side or both sides of each of the bent portions of the electric wires 61 accommodated in the first electric wire routing groove portion 31A, the second electric wire routing groove portion 31B, and the second electric wire passing portion 33B is or are locked and retained by the locking pieces 39 of the single wire locking portion 38 or the electric wire locking portions 38.

The single or the plurality of electric wire locking portions 38 (the first wire locking portion and the second wire locking portion) are also provided at the positions where the third electric wire passing portion 33C is connected to the first electric wire routing groove portion 31A and the second electric wire routing groove portion 31B. Thus, a side or both sides of each of the bent portions of the electric wires 61 accommodated in the first electric wire routing groove portion 31A, the second electric wire routing groove portion 31B, and the third electric wire passing portion 33C are locked and retained by the locking pieces 39 of the single wire locking portion 38 or the electric wire locking portions 38.

Figure 5:
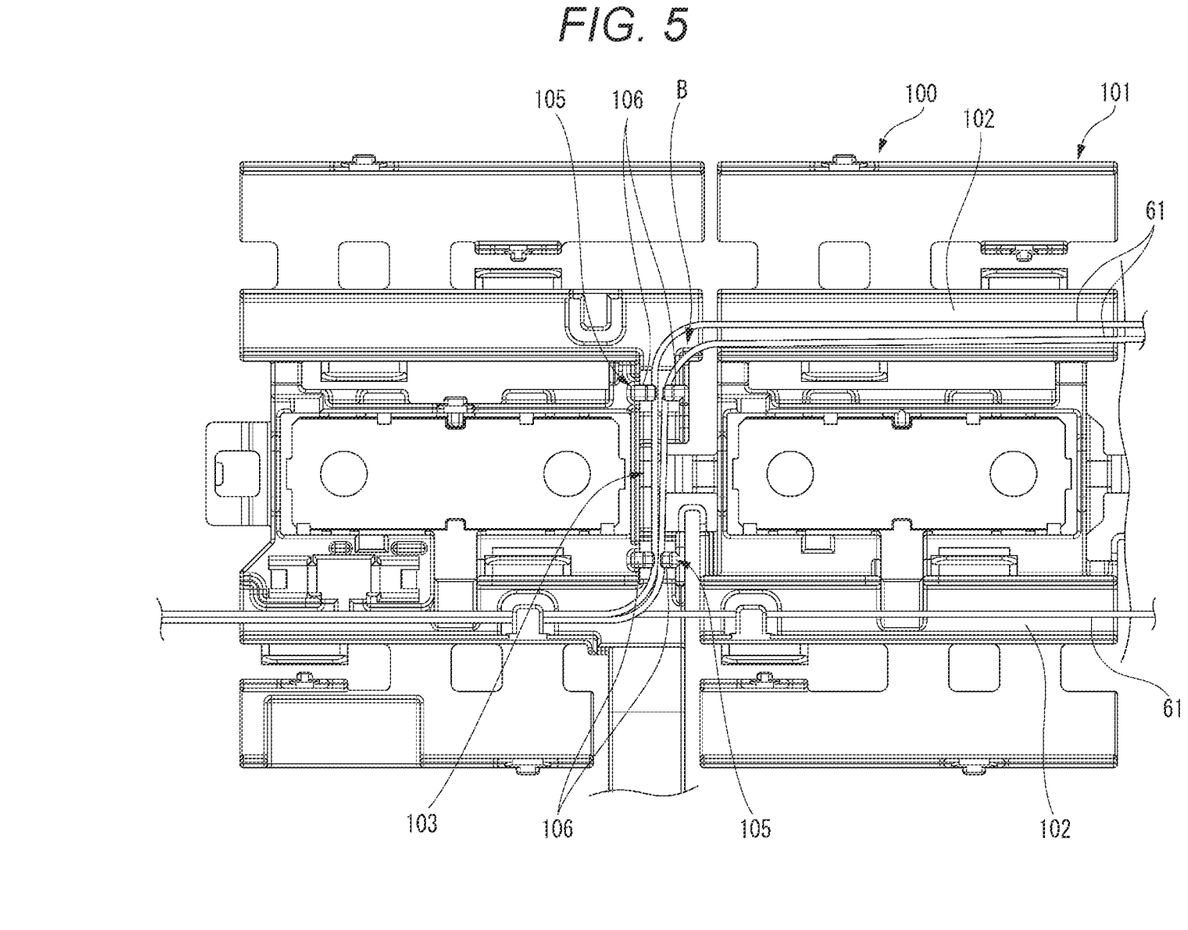
FIG. 5 is a plan view of a part of a busbar module according to a reference example.

Here, busbar modules 100, 110 according to reference examples will be described. FIG. 5 is a plan view of a part of the busbar module 100 according to a reference example. As shown in FIG. 5, in the busbar module 100 according to the reference example, a case 101 includes parallel electric wire routing groove portions 102, and an electric wire passing portion 103 connecting the electric wire routing groove portions 102. The electric wire passing portion 103 is provided with an electric wire locking portion 105 having a pair of locking pieces 106. In the case 101, the electric wires 61 is accommodated and routed in the electric wire routing groove portions 102 and the electric wire passing portion 103, and the electric wires 61 are locked by the electric wire locking portion 105 provided in the electric wire passing portion 103.

Figure 6:
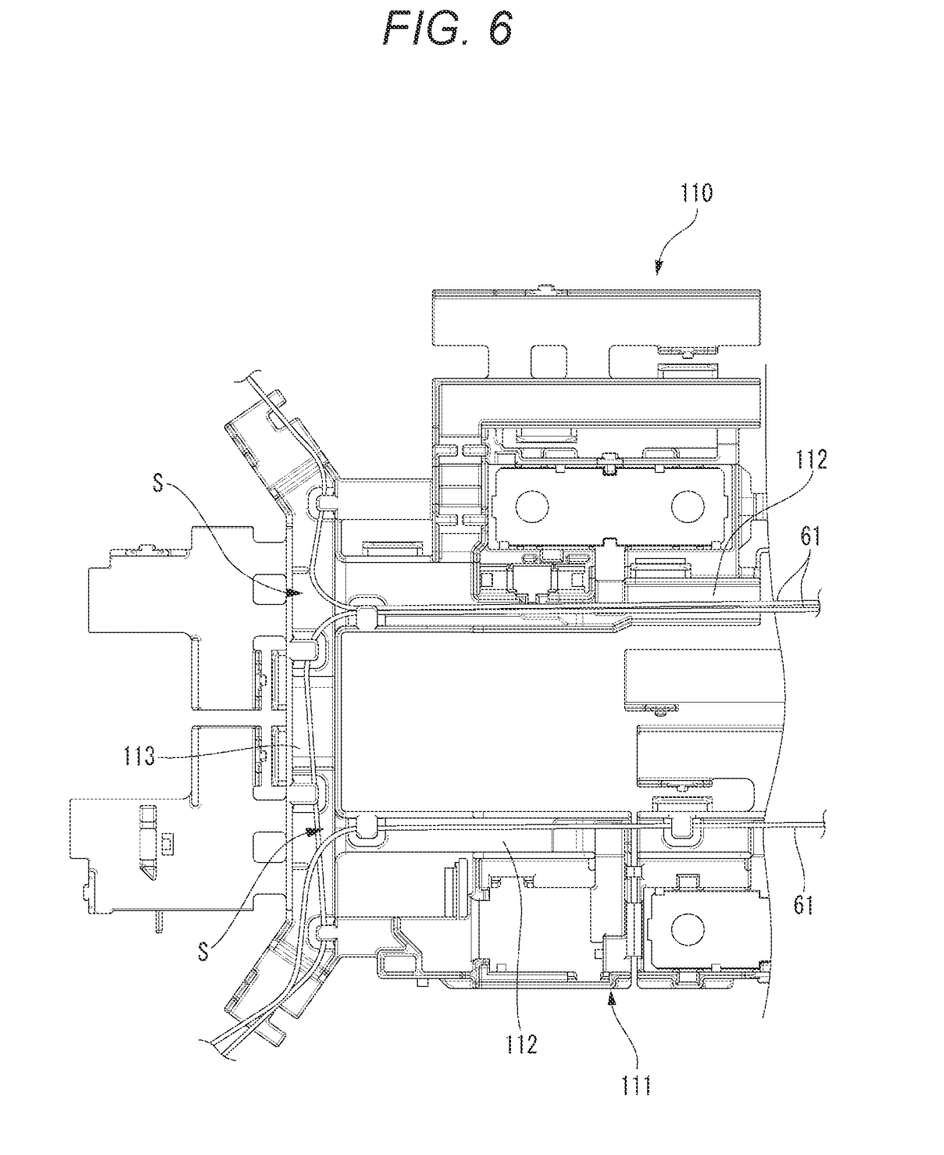
FIG. 6 is a plan view of a part of a busbar module according to another reference example.

FIG. 6 is a plan view of a part of the busbar module 110 according to another reference example. As shown in FIG. 6, in the busbar module 110 according to the another reference example, a case 111 includes parallel electric wire routing groove portions 112, and an electric wire passing portion 113 connecting the electric wire routing groove portions 112. In the case 111, the electric wires 61 are accommodated and routed in the electric wire routing groove portions 112 and the electric wire passing portion 113. The electric wire passing portion 113 also serves as an electric wire lead-out mouth, and the electric wires 61 routed in the electric wire routing groove portions 112 are guided to an end portion of the wire passing portion 113 via branch portions S connecting the electric wire routing groove portions 112 and the electric wire passing portion 113 and drawn out to an outside.

In the former reference example, when the electric wires 61 are bent and routed at connection portions between the electric wire routing groove portions 102 and the electric wire passing portion 103, the electric wires 61 may get on corner portions inside bents at the connection portions between the electric wire routing groove portions 102 and the electric wire passing portion 103. Then, when a cover is attached to an upper portion of the electric wire routing groove portions 102 and the electric wire passing portion 103, at this corner portion (see, for example, B portion in FIG. 5), the electric wires 61 may be caught/bitten, and reliability of voltage detection or temperature measurement may be lowered.

Further, in the latter reference example, a routing direction of the electric wires 61 may be wrong at the branch portions S during a routing work of routing the electric wires 61 to the connection portions between the electric wire routing groove portions 112 and the electric wire passing portion 113, which may cause erroneous routing.

Meanwhile, according to the bushbar module 10 according to the embodiment, the guide tapers 37 formed inside the bends of the electric wires 61 which are bent and routed to guide the electric wires 61 are provided at connection points where the first electric wire passing portion 33A, the second electric wire passing portion 33B, and the third electric wire passing portion 33C intersect with and are connected to the first electric wire routing groove portion 31A and the second electric wire routing groove portion 31B. As a result, when the electric wires 61 are routed at the connection portions, the electric wires 61 can be smoothly bent along the guide tapers 37 without difficulty to be accommodated in the first electric wire routing groove portion 31A, the second electric wire routing groove portion 31B, the first electric wire passing portion 33A, the second electric wire passing portion 33B, and the third electric wire passing portion 33C. Moreover, when performing the routing work, a routing direction of the electric wires 61 can be easily grasped by using the guide tapers 37 as marks, and erroneous routing can be prevented. When the electric wires 61 are accommodated in the first electric wire routing groove portion 31A, the second electric wire routing groove portion 31B, the first electric wire passing portion 33A, the second electric wire passing portion 33B, and the third electric wire passing portion 33C, both sides of each of the bent portions of the electric wires 61 are locked by the electric wire locking portions 38, so that the accommodated electric wires 61 can be reliably prevented from falling off from the first electric wire routing groove portion 31A, the second electric wire routing groove portion 31B, the first electric wire passing portion 33A, the second electric wire passing portion 33B, and the third electric wire passing portion 33C.

As a result, the workability of routing the electric wires 61 to the first electric wire routing groove portion 31A, the second electric wire routing groove portion 31B, the first electric wire passing portion 33A, the second electric wire passing portion 33B, and the third electric wire passing portion 33C can be improved, and occurrence of a routing failure in which the electric wires protrude can be prevented.

Moreover, by attaching the cover 25 to the case 20, it is possible to further prevent the electric wires 61 from falling off. In addition, since protrusion of the electric wires 61 is prevented, biting of the electric wires 61 can be prevented by attaching the cover 25. As a result, damage caused by being the electric wires 61 bitten such as an electric wire for voltage detection and an electric wire for temperature measurement can be prevented, and the busbar module 10 having high reliability can be obtained.

Figure 7:
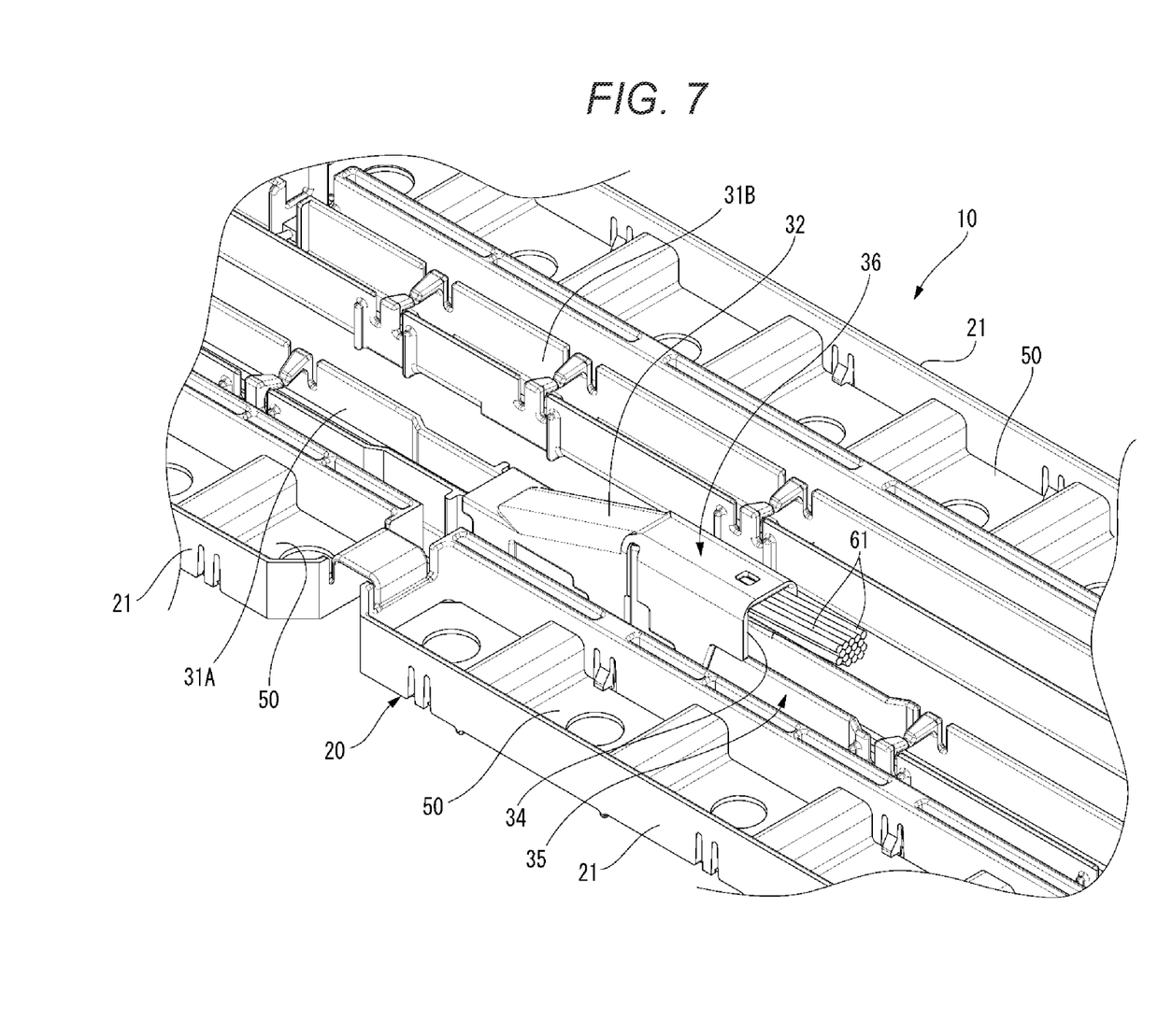
FIG. 7 is a perspective view of an electric wire take-out portion provided in a case.
Figure 8A:
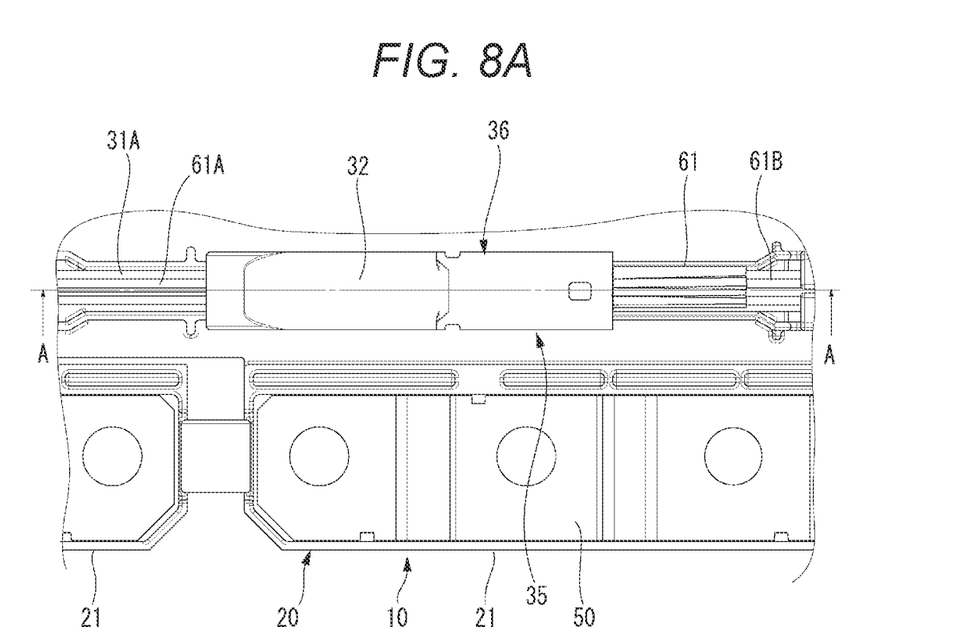
Figure 8B:
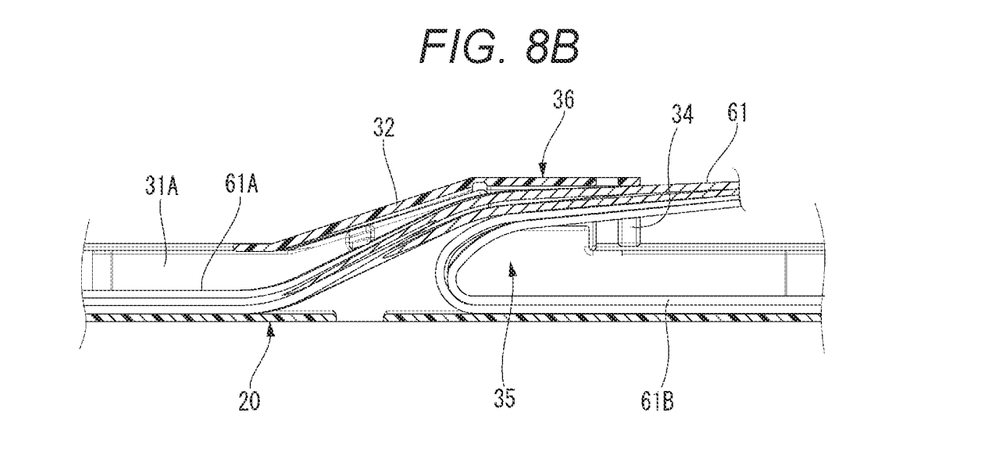

FIG. 7 is a perspective view of the electric wire take-out portion 35 provided in the case 20. FIGS. 8A and 8B are diagrams showing the electric wire take-out portion 35, where FIG. 8A is a plan view and FIG. 8B is a cross-sectional view taken along a line A-A in FIG. 8A.

As shown in FIGS. 7, 8A, and 8B, the electric wire holding cover 36 is attached to the electric wire take-out portion 35. As a result, an upper portion of the electric wire take-out portion 35 is covered by the electric wire holding cover 36. When the electric wire holding cover 36 is attached to the electric wire take-out portion 35, the electric wire lead-out mouth 34 that opens toward the other end 20B side of the case 20 is formed in the electric wire take-out portion 35. The electric wire holding cover 36 includes the guide portion 32 that gradually inclines upward toward the electric wire lead-out mouth 34 when the electric wire holding cover 36 is attached to the take-out portion 35.

The electric wire group 61A is drawn into the electric wire take-out portion 35 of the first electric wire routing groove portion 31A from one end 20A side of the case 20, and the electric wire group 61B is drawn into the electric wire take-out portion 35 of the first electric wire routing groove portion 31A from the other end 20B side of the case 20. In the electric wire take-out portion 35, the electric wire group 61B from the other end 20B side of the case 20 is folded back, and the electric wire group 61A from the one end 20A side of the case 20 is overlapped with a folded portion of the folded electric wire group 61B. Further, these electric wire groups 61A, 61B are collectively drawn out from the electric wire lead-out mouth 34 formed by attaching the electric wire holding cover 36 to the electric wire take-out portion 35 (see FIG. 8B).

It is conceivable that all the electric wires 61 routed in the second electric wire routing groove portion 31B closer to the other end 20B side of the case 20 than the electric wire take-out portion 35 are routed so as to be guided to the first electric wire routing groove portion 31A through the second electric wire passing portion 33B and the third electric wire passing portion 33C, which are closer to the other end 20B of the case 20 than the electric wire take-out portion 35. However, in this case, in the first electric wire routing groove portion 31A, the number of electric wires 61 drawn into the electric wire take-out portion 35 from the other end 20B side of the case 20 increases. That is, the number of electric wires 61 that are folded back and drawn out from the electric wire lead-out mouth 34 toward the other end 20B side of the case 20 increases in the electric wire take-out portion 35. Then, in the electric wire take-out portion 35, the electric wires 61 that are vertically overlapped with one another become bulky.

According to the busbar module 10 according to the present embodiment, the electric wire group 61A routed closer to the other end 20B side of the case 20 than the electric wire take-out portion 35 in the second electric wire routing groove portion 31B is passed through the first electric wire passing portion 33A on the one end 20A side of the case 20, then guided to the first electric wire routing groove portion 31A and drawn out from the electric wire take-out portion 35. As a result, in the electric wire take-out portion 35, the number of electric wires 61 in the electric wires group 61B drawn from the other end 20B side of the case 20 can be reduced. That is, in the electric wire take-out portion 35, the number of electric wires 61 in the electric wire groups 61B, after drawn into from the other end 20B side of the case 20, folded back toward the other end 20B side of the case 20 and drawn out from the other end 20B side of the case 20 can be reduced. Therefore, it is possible to prevent bulkiness of the electric wires 61 in the electric wire take-out portion 35, and to reduce the height of the electric wires 61.

Since, in the case 20, only the first electric wire passing portion 33A is closer to the one end 20A side than the electric wire take-out portion 35 among three electric wire passing portions (i.e., only the first electric wire passing portion 33A is provided further in the first direction than the electric wire take-out portion 35), a routing route of the electric wire group 61A is limited. Therefore, when a routing work of the wire harness 60 to the case 20 is performed, the electric wire groups 61A, 61B can be smoothly routed while preventing erroneous routing of the electric wire group 61A.

In addition, according to the busbar module 10 according to the present embodiment, the electric wire holding cover 36 that holds the electric wires 61 and forms the electric wire lead-out mouth 34 which opens toward the other end 20B side of the case 20 and from which the electric wires 61 are drawn out is attached to the electric wire take-out portion 35. Therefore, by attaching the electric wire holding cover 36 to the electric wire take-out portion 35, a plurality of electric wires 61 can be held by the electric wire take-out portion 35, and the electric wires 61 can be smoothly led out from the electric wire lead-out mouth 34.

In addition, the electric wire holding cover 36 includes the guide portion 32 that guides the electric wire group 61A drawn into the electric wire take-out portion 35 from the one end 20A side of the case 20 to the electric wire lead-out mouth 34. Accordingly, by attaching the electric wire holding cover 36 to the electric wire take-out portion 35, the electric wire group 61A that is accommodated in the first electric wire routing groove portion 31A and is drawn into the electric wire take-out portion 35 from the one end 20A side of the case 20 can be guided to the electric wire lead-out mouth 34 by the guide portion 32, and can be smoothly led out from the electric wire lead-out mouth 34.

Figure 9:
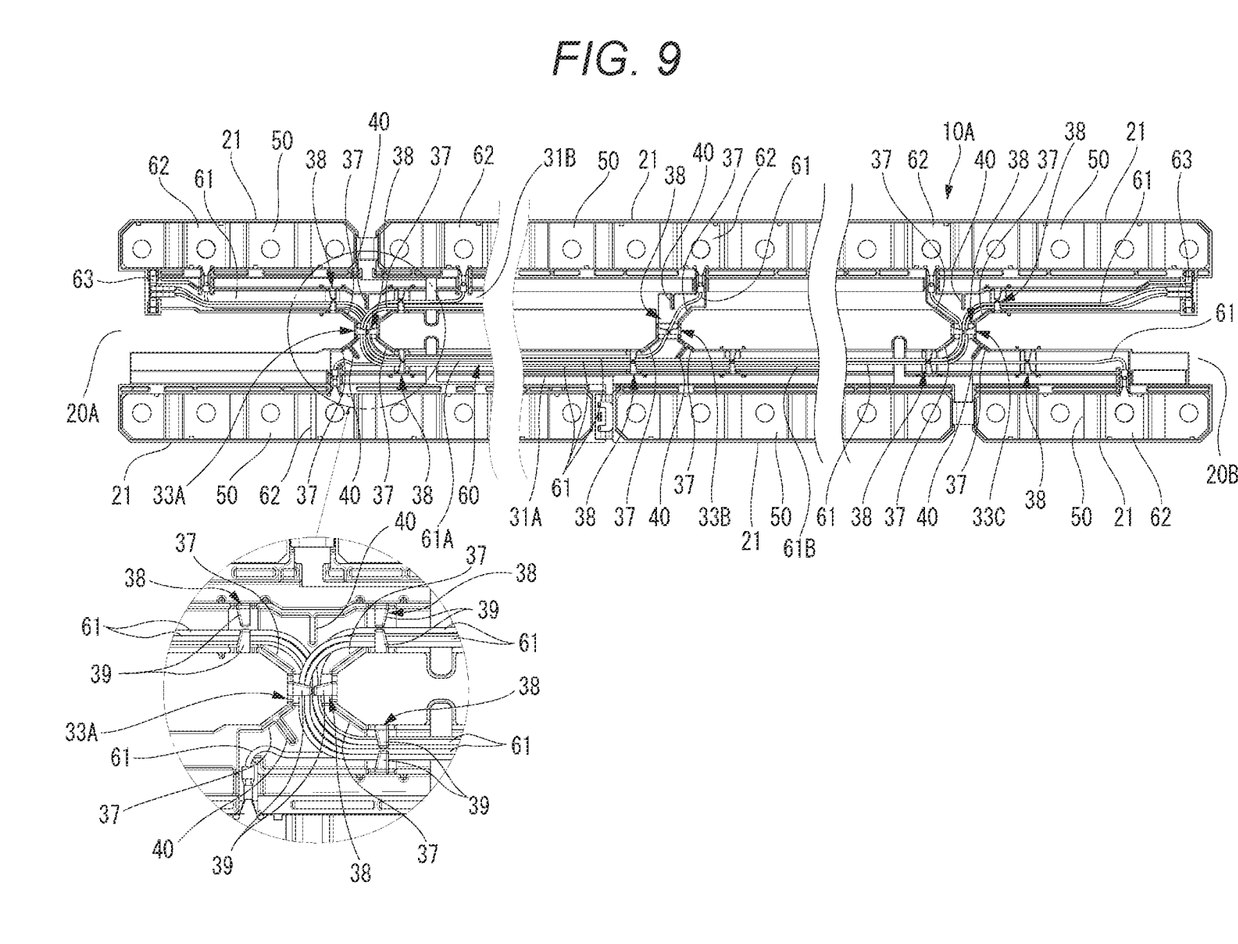
FIG. 9 is a plan view and a partial enlarged view of a busbar module according to another embodiment of the present invention.
Figure 10:
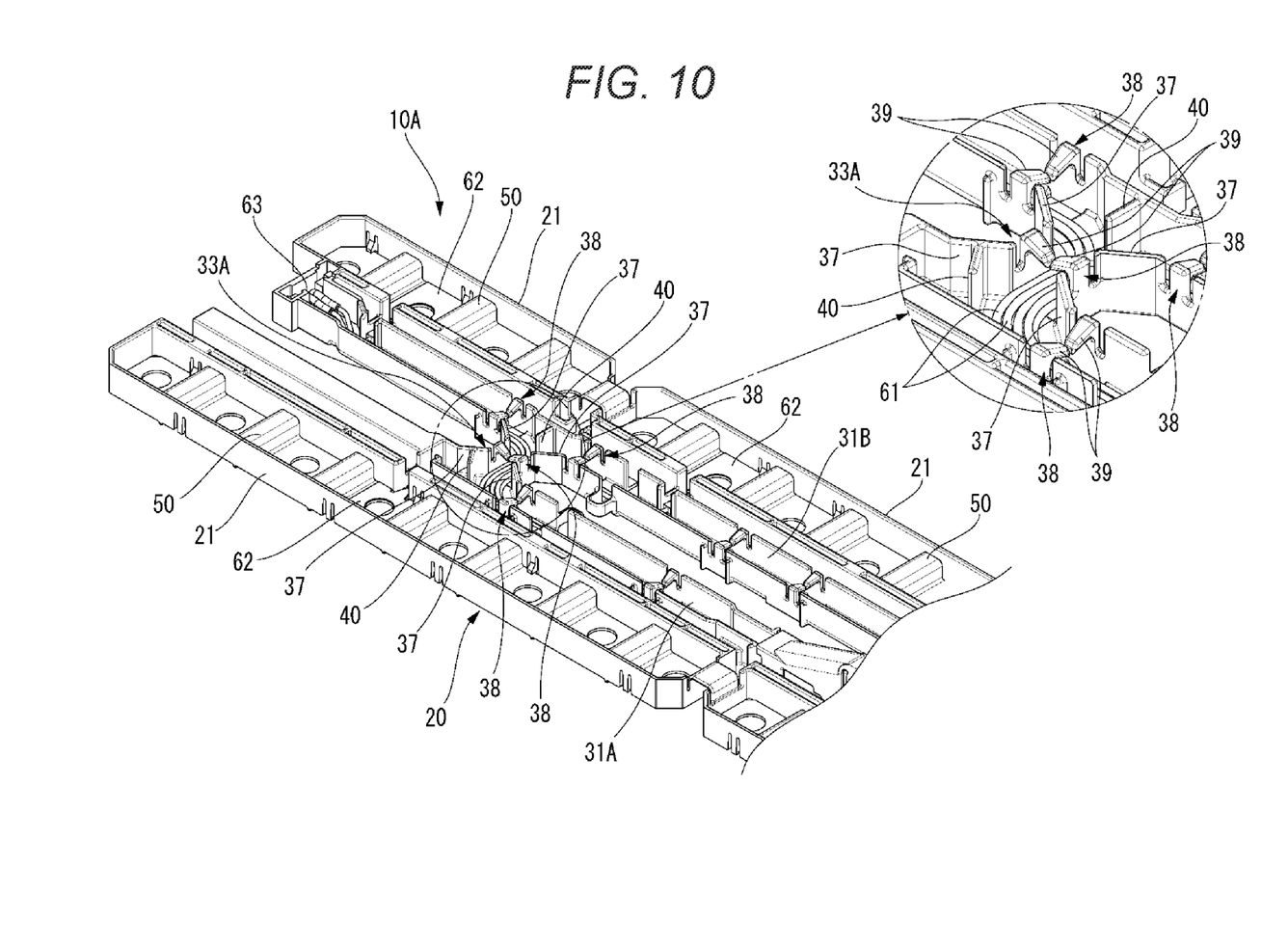
FIG. 10 is a perspective view and a partial enlarged view of the busbar module according to the another embodiment.

Next, a busbar module 10A according to another embodiment of the present invention will be described. The same components as those in the embodiment are denoted by the same reference numerals, and description thereof is omitted. FIG. 9 is a plan view and a partial enlarged view of the busbar module 10A according to the another embodiment of the present invention. FIG. 10 is a perspective view and a partial enlarged view of the busbar module 10A according to the another embodiment.

As shown in FIGS. 9 and 10, in the busbar module 10A according to the another embodiment, two guide ribs 40 are provided at positions where the first electric wire passing portion 33A is connected to the first electric wire routing groove portion 31A and the second electric wire routing groove portion 31B. One guide rib 40 is provided at a corner portion between the first electric wire routing groove portion 31A and the first electric wire passing portion 33A. The guide taper 37 is formed at the corner portion where the guide rib 40 is provided, and the guide rib 40 protrudes from the guide taper 37. The other guide rib 40 protrudes from a wall surface opposite to the first electric wire passing portion 33A at the connection portion between the second electric wire routing groove portion 31B and the first electric wire passing portion 33A. A routing direction of the electric wires 61 is regulated by the guide ribs 40 at the positions where the first electric wire passing portion 33A is connected to the first electric wire routing groove portion 31A and the second electric wire routing groove portion 31B that are provided with the guide rib 40. As a result, the electric wires 61 are guided by the guide ribs 40 to a predetermined routing route.

Similarly, the two guide ribs 40 are provided at positions where the second electric wire passing portion 33B is connected to the first electric wire routing groove portion 31A and the second electric wire routing groove portion 31B. One guide rib 40 is provided at a corner portion between the first electric wire routing groove portion 31A and the second electric wire passing portion 33B. The guide taper 37 is formed at the corner portion where the guide rib 40 is provided, and the guide rib 40 protrudes from the guide taper 37. The other guide rib 40 protrudes from a wall surface opposite to the second electric wire passing portion 33B at the connection portion between the second electric wire routing groove portion 31B and the second electric wire passing portion 33B. Even at positions where the second electric wire passing portion 33B is connected to the first electric wire routing groove portion 31A and the second electric wire routing groove portion 31B that are provided with the guide rib 40, the routing direction of the electric wires 61 is regulated by the guide ribs 40, and the electric wires 61 are guided to the predetermined routing route.

The two guide ribs 40 are also provided at positions where the third electric wire passing portion 33C is connected to the first electric wire routing groove portion 31A and the second electric wire routing groove portion 31B. One guide rib 40 is provided at a corner portion between the first electric wire routing groove portion 31A and the third electric wire passing portion 33C. The guide taper 37 is formed at the corner portion where the guide rib 40 is provided, and the guide rib 40 protrudes from the guide taper 37. The other guide rib 40 protrudes from a wall surface opposite to the third electric wire passing portion 33C at the connection portion between the second electric wire routing groove portion 31B and the third electric wire passing portion 33C. Even at positions where the third electric wire passing portion 33C is connected to the first electric wire routing groove portion 31A and the second electric wire routing groove portion 31B that are provided with the guide rib 40, the routing direction of the electric wires 61 is regulated by the guide ribs 40, and the electric wires 61 are guided to the predetermined routing route.

As described above, in the busbar module 10A according to the another embodiment, the routing direction of the electric wires 61 is regulated by the guide ribs 40, and the electric wires 61 are guided to the predetermined routing route. Further, by visually checking the guide ribs 40, an operator can recognize that attention is required for the routing route of the electric wires 61. As a result, the workability of routing the electric wires 61 can be further improved, and the erroneous routing can be prevented.

While the present invention has been described with reference to certain exemplary embodiments thereof, the scope of the present invention is not limited to the exemplary embodiments described above, and it will be understood by those skilled in the art that various changes and modifications may be made therein without departing from the scope of the present invention as defined by the appended claims.

According to an aspect of the embodiments described above, a busbar module (10, 10A) includes a case (20) configured to be attached to a battery assembly (1) including a plurality of single cells (3), a bushbar (50) supported by the case (20) and configured to be electrically connected to an electrode (5) of each of the plurality of single cells (3) of the battery assembly (1) and a plurality of electric wires (61) configured to be routed in the case (20). The case (20) is provided with a plurality of electric wire routing grooves (first and second electric wire routing groove portions 31A, 31B, first to third electric wire passing portions 33A to 33C) configured to accommodate and route the plurality of electric wires (61), the plurality of electric wire routing grooves (first and second electric wire routing groove portions 31A, 31B, first to third electric wire passing portions 33A to 33C) intersecting with and being connected to one another. At least a part of the plurality of electric wires (61) is configured to be bent at a connection portion of the plurality of electric wire routing grooves (first and second electric wire routing groove portions 31A, 31B, first to third electric wire passing portions 33A to 33C) at which the plurality of electric wire routing grooves (first and second electric wire routing groove portions 31A, 31B, first to third electric wire passing portions 33A to 33C) are connected to one another. The connection portion is provided with a guide taper (37) provided inside a bent portion of the at least a part of the plurality of electric wires (61), the guide taper being configured to guide the at least a part of the plurality of electric wires (61) and a wire locking portion (38) configured to lock the at least a part of the plurality of electric wires (61) at a side of the bent portion of the at least a part of the plurality of electric wires (61).

The wire locking portion (38) may include a first wire locking portion (38) and a second wire locking portion (38) configured to lock the at least a part of the plurality of electric wires (61) at both sides of the bent portion of the at least a part of the plurality of electric wires (61), respectively.

According to the busbar module having the above configuration, the connection portion of the electric wire routing groove portions is provided with the guide taper formed inside the bend of the electric wires which are bent and routed to guide the electric wires. As a result, when the electric wires are routed to the connection portion of the electric wire routing groove portions, the electric wires can be bent smoothly along the guide taper without difficulty and accommodated in the electric wire routing groove portions. Moreover, when performing a routing work, a routing direction of the electric wires can be easily grasped by using the guide taper as a mark, and erroneous routing can be prevented. Further, when the electric wires are accommodated in the electric wire routing groove portions, the both end positions of the bent portion of the electric wires which are bent and routed are locked by the electric wire locking portion, respectively, so that the accommodated electric wires can be reliably prevented from coming out from the electric wire routing groove portions. As a result, it is possible to improve workability of routing the electric wires to the electric wire routing groove portions, and it is possible to prevent occurrence of a routing failure in which the electric wires protrude from the electric wire routing groove portions at the connection portion of the electric wire routing groove portions.

The busbar module (10, 10A) may further include a cover (25) configured to be attached to the case (20). The cover (25) may be configured to cover the electric wire routing grooves (first and second electric wire routing groove portions 31A, 31B, first to third electric wire passing portions 33A to 33C).

According to the busbar module having the above configuration, when the cover is attached in the case, the electric wire routing groove portions are closed by the cover. Therefore, the electric wires routed in the electric wire routing groove portions can be further prevented from coming off. In addition, since protrusion of the electric wires at the connection portion of the electric wire routing groove portions is prevented, biting of the electric wires can be prevented by assembling the cover. As a result, damage caused by biting an electric wire such as an electric wire for voltage detection and an electric wire for temperature measurement can be prevented, and the busbar module having high reliability can be obtained.

The connection portion may be provided with a guide rib (40) configured to regulate a routing direction of the at least a part of the plurality of electric wires (61) and to guide the at least a part of the plurality of electric wires (61) to a predetermined routing route.

According to the busbar module having the above configuration, when the electric wires are routed in the case, the routing direction of the electric wires is regulated by the guide rib, and the electric wires are guided to the predetermined routing route. Further, by visually checking the guide rib, an operator can recognize that attention is required for the routing route of the electric wires. As a result, the workability of routing the electric wires can be further increased, and the erroneous routing can be prevented.

The plurality of electric wire routing grooves may include a first electric wire routing groove portion (31A) and a second electric wire routing groove portion (31B) provided in parallel with each other and extending from a first end (20A) to a second end (20B) of the case (20) in a longitudinal direction, and a plurality of electric wire passing portions (first to third electric wire passing portions 33A to 33C) each connecting the first electric wire routing groove portion (31A) and the second electric wire routing groove portion (31B) with each other. The first electric wire routing groove portion (31A) may be provided with an electric wire take-out portion (35) in a middle of the case (20) in the longitudinal direction, the electric wire take-out portion (35) being configured such that the plurality of electric wires (61) are drawn out from the electric wire take-out portion (35) in a second direction oriented from the first end (20A) toward the second end (20B) of the case (20), an opposite direction to the second direction being a first direction oriented from the second end (20B) toward the first end (20A). At least a part (electric wire group 61A) of the plurality of electric wires (61) accommodated in the second electric wire routing groove portion (31B) may pass through one (first electric wire passing portion 33A) of the plurality of electric wire passing portions (first to third electric wire passing portions 33A to 33C), the one (first electric wire passing portion 33A) being provided further in the first direction than the electric wire take-out portion (35), extend in the first electric wire routing groove portion (31A) in the second direction and further extend out of the electric wire take-out portion (35) in the second direction.

According to the busbar module having the above configuration, at least a part of the electric wires routed in the second electric wire routing groove portion on the other end side of the case with respect to the electric wire take-out portion is passed through the electric wire passing portion on the one end side of the case, then guided to the first electric wire routing groove portion, and drawn out from the electric wire take-out portion. As a result, in the electric wire take-out portion, the number of electric wires drawn into from the other end side of the case can be reduced. In other words, in the electric wire take-out portion, the number of electric wires folded back to and drawn out from the other end side of the case after drawn into from the other end side of the case can be reduced. Therefore, it is possible to prevent bulkiness of the electric wires in the electric wire take-out portion, and to reduce height.

The busbar module (10, 10A) may further include an electric wire holding cover (36) configured to be attached to the electric wire take-out portion (35). The electric wire holding cover (36) may be configured to, when the electric wire holding cover (36) is attached to the electric wire take-out portion (35), hold the at least a part (electric wire group 61A) of the plurality electric wires (61) and to form an electric wire lead-out mouth (34) opening toward the second end (20B) of the case (20), the electric wire lead-out mouth (34) being configured such that the at least a part (electric wire group 61A) of the plurality of electric wires (61) is drawn out from the electric wire lead-out mouth (34).

According to the bushbar module having the above configuration, by attaching the electric wire holding cover to the electric wire take-out portion, the plurality of electric wires can be held by the electric wire take-out portion, and these electric wires can be smoothly led out from the electric wire lead-out mouth.

The electric wire holding cover (36) may include a guide portion (32) configured to guide the at least a part (electric wire group 61A) of the plurality of electric wires (electric wire group 61A) drawn into the electric wire take-out portion (35) from a side of the first end (20A) of the case (20) toward the electric wire lead-out mouth (34).

According to the busbar module having the above configuration, by attaching the electric wire holding cover to the electric wire take-out portion, the electric wires accommodated in the first electric wire routing groove portion and drawn into the electric wire take-out portion from the one end side of the case can be guided to the electric wire lead-out mouth by the guide portion, and can be smoothly led out from the electric wire lead-out mouth.

What is claimed is:

1. A busbar module including:
   a case configured to be attached to a battery assembly including a plurality of single cells;
   a busbar supported by the case and configured to be electrically connected to an electrode of each of the plurality of single cells of the battery assembly; and
   a plurality of electric wires configured to be routed in the case,
   wherein the case is provided with a plurality of electric wire routing grooves configured to accommodate and route the plurality of electric wires, the plurality of electric wire routing grooves intersecting with and being connected to one another;
   wherein at least a part of the plurality of electric wires is configured to be bent at a connection portion of the plurality of electric wire routing grooves at which the plurality of electric wire routing grooves are connected to one another; and
   wherein the connection portion is provided with: a guide taper provided inside a bent portion of the at least a part of the plurality of electric wires, the guide taper being configured to guide the at least a part of the plurality of electric wires; and a wire locking portion configured to lock the at least a part of the plurality of electric wires at a side of the bent portion of the at least a part of the plurality of electric wires;
   wherein one of the electric wire routing grooves includes a bottom surface and a pair of groove walls spaced apart from each other, the plurality of wires extend on the bottom surface, the groove walls protrude from the bottom surface and extend in a longitudinal direction of the case;
   wherein the guide taper protrudes from the bottom surface and abuts one of the groove walls and extends away from both groove walls in a direction that intersects the longitudinal direction,
   wherein the connection portion is provided with a guide rib configured to regulate a routing direction of the at least a part of the plurality of electric wires and to guide the at least a part of the plurality of electric wires to a predetermined routing route, and
   wherein the guide rib protrudes from the guide taper.

2. The busbar module according to claim 1,
   wherein the wire locking portion includes a first wire locking portion and a second wire locking portion configured to lock the at least a part of the plurality of electric wires at both sides of the bent portion of the at least a part of the plurality of electric wires, respectively.

3. The busbar module according to claim 1 further including
   a cover configured to be attached to the case,
   wherein the cover is configured to cover the electric wire routing grooves.

4. The busbar module according to claim 1,
   wherein the plurality of electric wire routing grooves include: a first electric wire routing groove portion and a second electric wire routing groove portion provided in parallel with each other and extending from a first end to a second end of the case in a longitudinal direction of the case; and a plurality of electric wire passing portions each connecting the first electric wire routing groove portion and the second electric wire routing groove portion with each other,
   wherein the first electric wire routing groove portion is provided with an electric wire take-out portion in a middle of the case in the longitudinal direction, the electric wire take-out portion being configured such that the plurality of electric wires are drawn out from the electric wire take-out portion in a second direction oriented from the first end toward the second end of the case, an opposite direction to the second direction being a first direction oriented from the second end toward the first end, and
   wherein at least a part of the plurality of electric wires accommodated in the second electric wire routing groove portion:
   passes through one of the plurality of electric wire passing portions, the one being provided further in the first direction than the electric wire take-out portion;
   extends in the first electric wire routing groove portion in the second direction; and
   further extends out of the electric wire take-out portion in the second direction.

5. The busbar module according to claim 4 further including
   an electric wire holding cover configured to be attached to the electric wire take-out portion,
   wherein the electric wire holding cover is configured to, when the electric wire holding cover is attached to the electric wire take-out portion, hold the at least a part of the plurality electric wires and to form an electric wire lead-out mouth opening-toward the second end of the case, the electric wire lead-out mouth being configured such that the at least a part of the plurality of electric wires is drawn out from the electric wire lead-out mouth.

6. The busbar module according to claim 5,
   wherein the electric wire holding cover includes a guide portion configured to guide the at least a part of the plurality of electric wires drawn into the electric wire take-out portion from a side of the first end of the case toward the electric wire lead-out mouth in the second direction.

7. The busbar module according to claim 1, wherein the wire locking portion includes a first pair of locking pieces and second pair of locking pieces, the guide taper is spaced away from and between the first pair of locking pieces and the second pair of locking pieces.

* * * * *